(12) United States Patent
Marchetto et al.

(10) Patent No.: US 7,733,237 B2
(45) Date of Patent: Jun. 8, 2010

(54) SIGNALING DEVICE AND METHOD OF CONTROLLING THE DEVICE

(75) Inventors: Oscar Marchetto, Oderzo (IT); Sergio Tomasella, San Polo di Piave (IT); Marco Centasso, Venice (IT)

(73) Assignee: Nice SpA, Oderzo (IT)

( * ) Notice: Subject to any disclaimer, the term of this patent is extended or adjusted under 35 U.S.C. 154(b) by 279 days.

(21) Appl. No.: 11/863,511

(22) Filed: Sep. 28, 2007

(65) Prior Publication Data

US 2008/0094237 A1    Apr. 24, 2008

(30) Foreign Application Priority Data

Oct. 24, 2006    (IT) .......................... TV2006A0190

(51) Int. Cl.
*G08B 21/00* (2006.01)
(52) U.S. Cl. .................. 340/648; 340/679; 49/118; 318/244; 324/772; 361/23
(58) Field of Classification Search ................. 340/648, 340/664, 679, 524; 318/453, 455, 565, 244; 324/772; 361/23, 31; 49/73.1, 118
See application file for complete search history.

(56) References Cited

U.S. PATENT DOCUMENTS

| | | | |
|---|---|---|---|
| 4,796,011 A | 1/1989 | Lemirande et al. | |
| 5,247,232 A | 9/1993 | Lin | |
| 6,078,263 A * | 6/2000 | Galloway, Jr. | ............... 340/679 |
| 6,201,318 B1 | 3/2001 | Guillory | |
| 6,741,052 B2 * | 5/2004 | Fitzgibbon | .................. 318/434 |
| 7,489,483 B2 * | 2/2009 | Frommer et al. | .............. 361/23 |

FOREIGN PATENT DOCUMENTS

DE    198 31 119    1/2000

OTHER PUBLICATIONS

European Search Report dated Jan. 25, 2008, from the corresponding European Application.

* cited by examiner

*Primary Examiner*—Davetta W Goins
(74) *Attorney, Agent, or Firm*—Katten Muchin Rosenman LLP

(57) ABSTRACT

Method for controlling a signalling device inserted in an automatism of gates (G), movable barriers, doors or the like, and having at least one warning device (L, BZ), characterized in that it supplies power from the signalling device (LL) to at least one mechanical group (M) having a motor, detects in the signalling device (LL) the absorbed power from the at least one mechanical group (M) having a motor, and activates the at least one warning device (L, BZ) when the predefined absorbed power threshold has been exceeded.

22 Claims, 3 Drawing Sheets

SIGNALING DEVICE AND METHOD OF CONTROLLING THE DEVICE

The invention regards a signalling device, and related control method, for automatisms, especially those for driving closure elements such as gates, movable barriers, doors or the like. Reference will be made below to the first of these.

Automation installations for gates are generally composed—see FIGS. 1 and 2—by an electric gear motor M for driving a gate G, a command unit U for controlling the gear motor M and for the centralised management of the entire installation, a driving command device C (digital keyboard and/or remote control and/or key selector) and a series of safety devices S (photocells, sensitive edges, light signallers). Certain components can in any case be missing, or present in more than one. For example, in automation installations for awnings, the safety devices S are absent and the command unit U is integrated inside the gear motor M together with the radio receiver R (FIG. 2). The tubular motors therein used have reduced size (in the smallest versions, the outer diameter can be only 24 millimetres) and for this reason the most widespread (remote) control system is the radio receiver R to which a remote control Tx transmits. In fact, there is no space in the gear motor M for connections via cable.

Usually, in the two cases described, the unit U is supplied by the public electricity network Supp.

The command unit U, due to the many variables in play, is not made in a single universal version for every installation of the same family. It must accept in input and/or output the number of connections necessary (via cable or wireless) for the particular installation, so to adequately connect all functional units. Hence, at least one command unit U must correspond to each installation type, with consequent multiplication of catalogue products and complex warehouse management.

In the installations of FIG. 1, alongside activated safety devices S operating on the closure element G, devices are adopted (light and/or acoustic devices) L which signal the movement state (stopped or underway) of the closure element G. Such devices L are connectable only with command units U equipped with appropriate (and often dedicated) connection or interface means—which are per se complex—and it is practically impossible to add them to the systems of FIG. 2 due to the lack of space inside the gear motor M, which prevents any addition of connections.

The object of the invention is to obtain, for an installation such as those described above, a method for installing a light and/or acoustic signalling device (DDS) so that it is connectable to any command unit U, independent of the prearrangement therein of connection means reserved to the signalling device.

Another object of the invention is to make an DDS for achieving the method, i.e. which is connectable to any command unit U, independent of the prearrangement therein of connection means reserved to the DDS.

Such object is obtained with a method for controlling a DDS inserted in an automatism of gates, movable barriers, doors or the like, and having a light and/or acoustic warning device characterized by supplying power through a DDS to at least one gear motor (or an equivalent mechanical group having a motor);

detecting, in the DDS, the power absorbed by the at least one gear motor;

activating the warning device when a predefined absorbed power threshold is exceeded.

To achieve the method, a DDS is adopted having a light and/or acoustic warning device characterized in that it comprises power supply means for supplying power to at least one gear motor (or an equivalent mechanical group having a motor);

detection means of the power absorbed by the at least one gear motor from the power supply means;

control means for activating the warning device when a predefined power absorption threshold has been exceeded, the exceeding being detected by the detection means.

According to the invention, the following considerations are applicable both to the method and DDS, and for brevity reference will only be made to the latter.

The DDS according to the invention can be applied to any control unit U, gear motor M or command device C, since it does not require particular connections but only standard or standardised connections or terminals. It will suffice to place it in series between a power supply source Supp (for example the public network, a battery, a transformer, solar panels etc.) and at least one gear motor M (or equivalent mechanical driving device). Downstream of the DDS, other components of the automatism can also be connected, like the unit U or the peripherals S and/or C. If connected to the public network, the DDS can conveniently comprise its own a power supply circuit, which establishes the network voltage at an appropriate value for its electric/electronic components. Or the DDS can be autonomously power-supplied, for example with batteries or solar cells. Naturally, the variation of the power supply voltage may require the variation/substitution/addition of electric components, in any case of known type.

The construction of the DDS moreover permits that it is easily usable and applicable in already existing automatisms in which no specific connection for a DDS is envisaged.

The command units U can moreover be made without providing for the DDS connection, thus diminishing their cost. This advantage is very important, particularly in products with little available space, as in the systems of FIG. 2 where the gear motors M are inserted inside a container tube and in which making a dedicated output to the DDS results nearly impossible due to the reduced size of the same.

Advantageously, the DDS can be made in a manner such that it is sensitive to the absorbed power through the measurement of the absorbed current, rather than integrating a power measurement device (for example, a wattmeter circuit).

The DDS in order to determine the absorbed power/current can be equipped with appropriate means for measuring the current absorbed by the devices placed downstream of the DDS, i.e. the gear motor M and/or command unit U. In fact, when the gear motor is idle, the absorbed current has a low value, while when the gear motor is activated the absorbed current increases, and the warning device signals this condition. A (minimum) threshold is very useful for in any case ensuring the power supply to the radio receiver R, which must always be operative for receiving commands from the transmitter Tx.

Whether absorbed power or current is measured, possible control thresholds can be introduced in the DDS (power thresholds and/or current thresholds) with which the absorbed power is compared. The DDS warning device is only activated above a certain threshold (i.e. the DDS activates the warning device if the power or current signal absorbed is greater than one of the predefined thresholds, otherwise it deactivates it).

In the case of DDS with light warning device (DDS+L), the activated phase of the warning device can correspond to a flashing.

Advantageously, the DDS provides for the use of a microprocessor (or analogous processing means) through which it is possible to set personalised and/or programmed uses of the DDS. For example, for a DDS+L, the "courtesy light" function can be activated (or not activated), i.e. activating the light warning device (for example a lamp) with fixed light, so that it functions as illuminator during motor movement, and/or keeping it activated with a settable delay even after the interruption of the gate movement, when it is detected that the absorbed power or current has fallen below a threshold. Or, the frequency of the flashings can be varied to give maintenance or attention/alarm messages.

The DDS can be connected to variable voltage generation means, and from the reading of said voltage one can obtain a parameter in relation to which the management can be established of the warning device and/or DDS itself, or a threshold power or current value.

Advantageously, through the microprocessor of the DDS, it is possible to count the number of manoeuvres (i.e. activations) executed by the automatism (for example, the number of openings) for implementing a diagnostic and maintenance warning system (faster or slower variation of the flashing frequency). It is moreover possible to control/monitor the power absorption downstream of the DDS in every instant, to evaluate cases of abnormal functioning and to consequently give an emergency warning with the warning device. The DDS according to the invention, therefore, can make an effective protection and safety system.

Naturally, the DDS can be simultaneously equipped with one or more light warning devices, but also with one or more acoustic warning devices or other similar devices, thus to emit different signal types.

The advantages of a device in accordance with the invention will be in any case more evident from the following description of a preferred embodiment, which makes reference to the attached drawing where:

Figure 1:
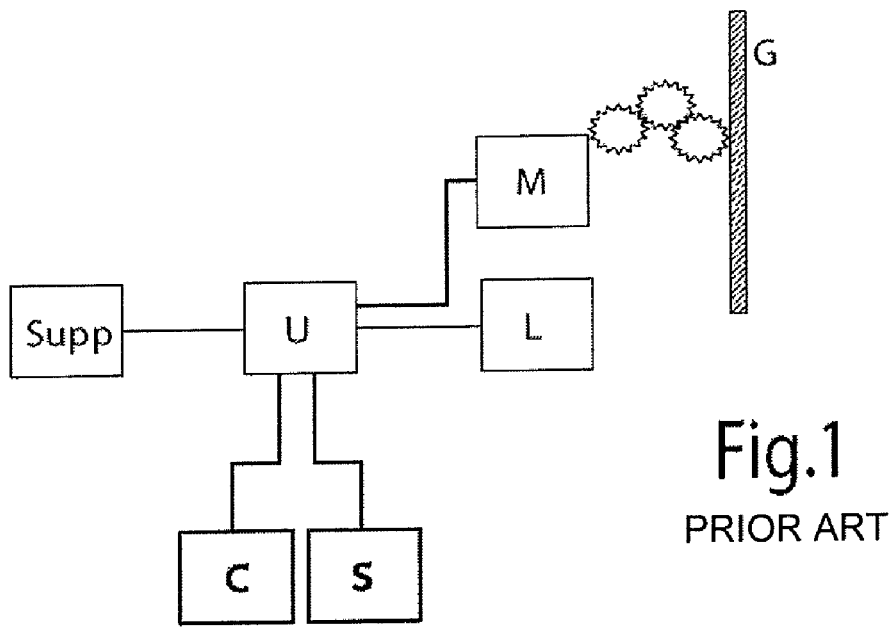
FIG. 1 shows a known automatism installation.
Figure 2:
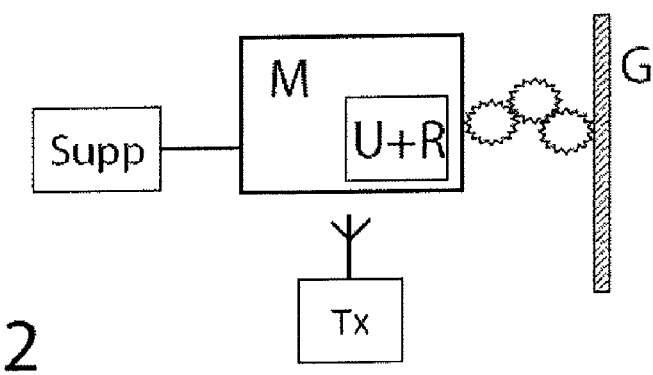
FIG. 2 shows a known automatism installation.
Figure 3A:
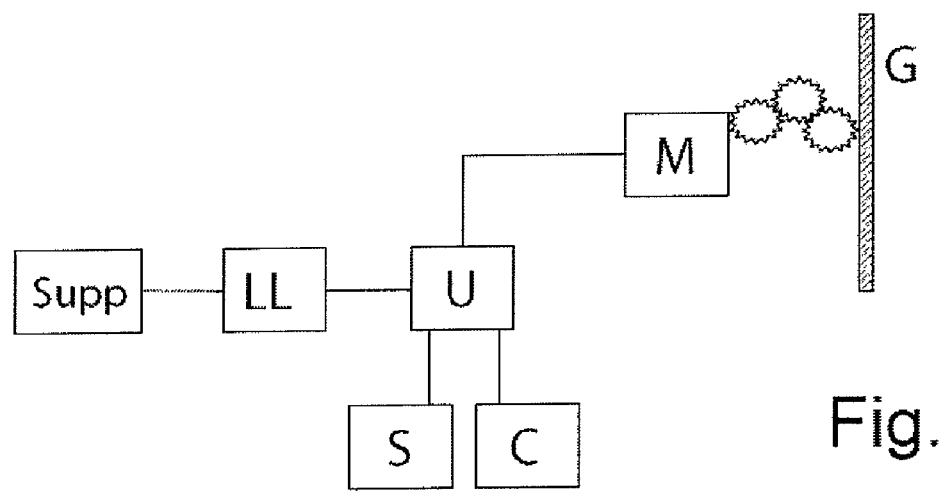
FIG. 3A shows an automatism installation with the DDS according to the invention.
Figure 3B:
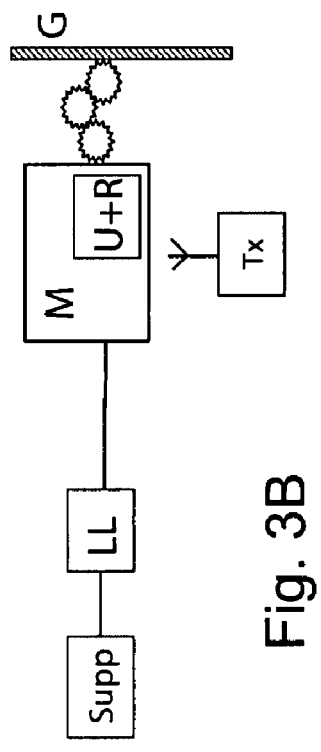
FIG. 3B shows an automatism installation with the DDS according to the invention.

In FIG. 3A, 3B, the components of an automatism installation with a DDS are shown according to the invention, indicated with LL (flasher). The other components are indicated as, and correspond with, those components already described in FIGS. 1 and 2.

The DDS LL is interposed between the power supply line Supp, from which it obtains its power supply, and the command unit U, which supplies power to the gear motor device M (or the like). In this manner, the power supply of the gear motor M occurs through the DDS LL, as for the remaining components of the automatism.

Given the connection type of the DDS LL with respect to the overall installation, it does not require particular connectors but only standard or standardisable connections or terminals, at most a pair of connectors.

The DDS LL can be supplied from the Supp network or through internal or external sources (batteries, solar panels, power supply devices, etc.).

Figure 4:
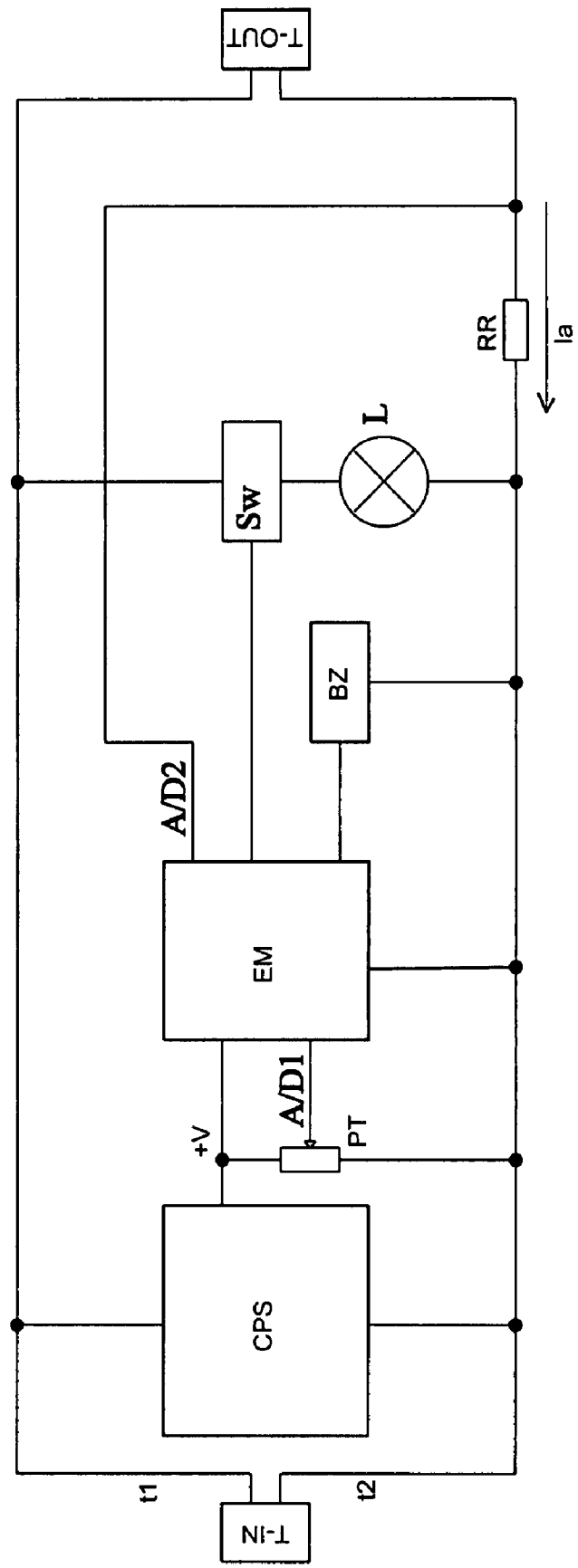
FIG. 4 shows the circuit diagram of a DDS according to the invention.

FIG. 4 shows the circuit diagram of a DDS LL according to the invention. It comprises a two-terminal input interface T-IN, where one terminal t1 is connected to the public network phase cable and a terminal t2 is connected to the neutral cable, and a corresponding output interface T-OUT.

The interface T-OUT is connected (or adapted to be connected) to the components downstream of the DDS LL. For example, the T-IN and T-OUT interfaces can simply comprise a terminal board or the like, and the connections with the components can be made with lead wires.

The following are shunt connected between phase and neutral: a light warning device (such as a lamp) L with in series an electronic switch Sw (for example a Triac) and a stabilised power supply circuit (or equivalent means) CPS for supplying power (see +V reference) to the components of the DDS LL.

The circuit CPS can comprise a half-wave rectifier, a levelling Zener diode and a capacitive drop impedance.

Between phase and neutral, a circuit RR (or equivalent means) is present for detecting the current absorbed at the interface T-OUT, comprising for example the parallel of a ballast resistor and two limiting antiparallel diodes.

Connected to the +V are the processing and control means EM (here a microcontroller or microprocessor), which:
  read the output voltage from the cursor of a potentiometer PT (supplied from the +V) by means of a line A/D1 (to which a converter A/D internally is connected);
  receive a signal from the RR circuit by means of a line A/D2 (to which a converter A/D internally is connected);
  control the switch Sw of the lamp L;
  drive a buzzer BZ.

Figure 5:
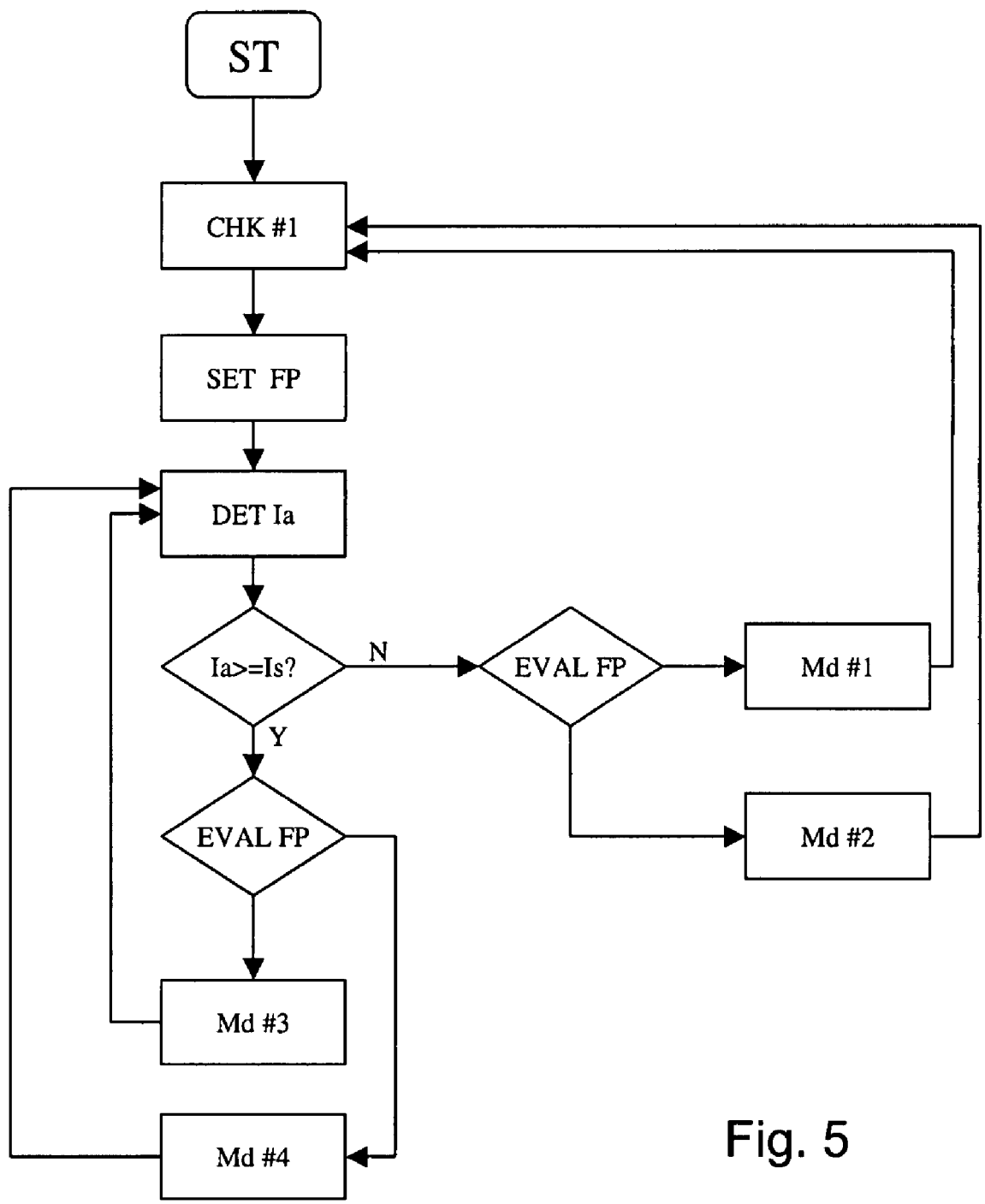
FIG. 5 shows a functioning flow diagram for a DDS according to the invention.

The DDS LL functions in the following manner (see also FIG. 5).

(start step=STart block):

By initially providing voltage to the interface T-IN, the switch Sw is opened and the lamp L turned off (inactivated). The CPS circuit generates the +V and supplies power to the processing means EM.

(initial control step=CHecK #1 block):

The processing means EM read the line A/D1 and register the voltage present therein. According to its value, for example by means of comparison with predefined values, they set, in a subsequent setting step (SET FunctionParameter block), the functioning mode FP of the lamp L and/or of the DDS LL. Such mode FP can provide functioning for the lamp L with courtesy light or with flashing light.

(current detection step=DETect Ia):

By means of the circuit RR and the line A/D2 (i.e. reading a voltage at the terminals of the circuit RR), the means EM detect the absorbed current Ia at the terminal T-OUT by what is connected downstream thereof, i.e. of the automatism of FIG. 3A, 3B.

Then (see decision block 'Ia>=Is?') the EM means compare the current Ia with a threshold current value Is.

If the current Ia is greater than Is, the means EM evaluate the functioning mode FP (EVALuate FP block). According to FP, the program flow into the means EM can reach two different function blocks (Md #3 or Md #4), where for example Md #3 determines the flashing of the lamp L (or the activation of a generic warning device with a fixed or preestablished frequency) and Md #4 determines its constant lightning (or the continuous activation of a generic warning device). The system then returns to the current detection step (DETect Ia).

If the current is less than Is, the means EM evaluate the functioning mode FP (EVALuate FP block). According to FP, the program flow into the means EM can reach two different function blocks (Md #1 or Md #2), where for example Md #1 determines the turning off of the lamp L (or warning device) after a first time interval (for example very small for a nearly instantaneous turning off) and Md #2 determines the turning off of the lamp L (or warning device) after a second time interval (for example much greater than the first, such that the lamp L remains on for a certain time after the gear motor M has been inactivated, and thus turns off with a delay with respect to the sub-threshold detection of the absorbed power).

The system then returns to the initial control step CHK #1.

A current peak detected in Ia is due to the absorption of the gear motor M and therefore the lamp L signals its operation. Particular current profiles, however, can indicate other operative or malfunctioning conditions (for example an overload), and the means EM can consequently intervene, signalling by means of the lamp L or acting with other communication interfaces (not shown). It is clear that the lamp L can be substituted or can cooperate with other types of warning devices, as already described.

The invention claimed is:

1. A method for controlling a signaling device, the signaling device disposed in an opening-and-closure mechanism for a gate, a movable barrier, or a door, the method comprising the steps of:
    (a) supplying power from the signaling device to a command unit and a mechanical group having a motor;
    (b) detecting in the signaling device a power absorption from the mechanical group;
    (c) activating a warning device associated with the opening-and-closure mechanism when a predefined power threshold for the power absorption has been exceeded.

2. The method according to claim 1, further comprising the step of
    comparing the power absorption with a plurality of predefined power thresholds.

3. The method according to claim 2, further comprising the step of
    activating the warning device if the power absorption is greater than one of the predefined power thresholds.

4. The method according to claim 1, further comprising prior to step (a) performing the step of
    establishing functional parameters of a predetermined frequency for activating the warning device.

5. The method according to claim 1, further comprising prior to step (a) performing the step of
    establishing functional parameters for activating the warning device in a continuous manner.

6. The method according to claim 2, further comprising the step of
    deactivating the warning device if the power absorption is less than a predetermined power threshold.

7. The method according to claim 6. further comprising prior to step (a) performing the step of
    establishing functional parameters for deactivating the one warning device after a pre-established time interval with respect to a predetermined threshold of the power absorption.

8. The method according to claim 1, wherein step (b) is performed by
    measuring a current absorbed by the mechanical group.

9. The method according to claim 1, further comprising the step of
    supplying power from the signaling device to a control unit or a safety device.

10. A signaling device for an opening-and-closure mechanism for a gate, a movable barrier, or a door, each having a warning device; the signaling device comprising
    a power supply means for supplying power from the signaling device to a control unit and to a mechanical group having a motor;
    a detection means for detecting a power absorption by the mechanical group from the power supply means;
    a control means for activating the warning device when a predetermined threshold of the power absorption is exceeded.

11. The signaling device according to claim 10, wherein the control means compares the power absorption with a plurality of predefined thresholds of the power absorption and deactivates the warning device if the power absorption is less than one of the predefined thresholds.

12. The signaling device according to claim 10, wherein the detection means comprises an absorbed current detection means for detecting the current absorption of the mechanical group.

13. The signaling device according to claim 10, wherein the control means activates the warning device with a pre-established frequency.

14. The signaling device according to claim 10, wherein the control means activates the warning device in a continuous manner.

15. The signaling device according claim 12, wherein the control means deactivates the warning device after a predetermined delay if the power absorption or the current absorption is less than predetermined threshold of the power absorption or the current absorption.

16. The signaling device according to claim 12, wherein the control means comprises a microcontroller connected to a variable voltage generation means, the microcontroller reading a voltage to determine the power absorption or the current absorption and compare the power absorption or the current absorption to the threshold.

17. The signaling device according to claim 16, wherein the microcontroller comprises a unit for managing the warning device.

18. The signaling device according to claim 10, wherein the power supply means supplies power to a command device or a safety device.

19. The signaling device according to claim 10, wherein the warning device comprises a lamp.

20. The signaling device according to claim 10, further comprising a power supply feeds from an external source connected to a stabilized power supply means for supplying power to the control means.

21. The signaling device according to claim 10, wherein the control means counts a number of activations of the mechanical group.

22. An automatic barrier comprising:
    an opening-and-closure mechanism;
    a warning device;
    a signaling device for the opening-and-closure mechanism, the signaling device comprising
        a power supply means for supplying power from the signaling device to a control unit and to a mechanical group having a motor;
        a detection means for detecting a power absorption by the mechanical group from the power supply means;
        a control means for activating the warning device when a predetermined threshold of the power absorption is exceeded.

* * * * *